(12) United States Patent
Yang

(10) Patent No.: US 10,014,117 B2
(45) Date of Patent: Jul. 3, 2018

(54) ELECTRICITY STORING/DISCHARGING DEVICE WITH SINGLE-LAYER FOLDING COVERING AND PACKAGING SINGLE INPUT/OUTPUT ELECTRIC CONDUCTIVE INTERFACE HAVING ELECTRODE PLATE PAIR WITH MULTIPLE-SIDED ELECTRIC CONDUCTIVE TERMINALS

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 961 days.

(21) Appl. No.: 14/310,542

(22) Filed: Jun. 20, 2014

(65) Prior Publication Data

US 2015/0371786 A1    Dec. 24, 2015

(51) Int. Cl.

| | | |
|---|---|---|
| H01G 9/048 | (2006.01) |
| H01G 11/12 | (2013.01) |
| H01G 11/26 | (2013.01) |
| H01M 2/26 | (2006.01) |
| H01M 2/30 | (2006.01) |
| H01M 4/70 | (2006.01) |
| H01M 2/02 | (2006.01) |
| H01M 10/04 | (2006.01) |
| H01M 2/10 | (2006.01) |
| H01M 2/16 | (2006.01) |
| H01M 8/0247 | (2016.01) |

(52) U.S. Cl.
CPC ............. *H01G 9/048* (2013.01); *H01G 11/12* (2013.01); *H01G 11/26* (2013.01); *H01M 2/021* (2013.01); *H01M 2/027* (2013.01); *H01M 2/0212* (2013.01); *H01M 2/0277* (2013.01); *H01M 2/0285* (2013.01); *H01M 2/0287* (2013.01); *H01M 2/0292* (2013.01); *H01M 2/26* (2013.01); *H01M 2/30* (2013.01); *H01M 4/70* (2013.01); *H01M 2/1061* (2013.01); *H01M 2/1653* (2013.01); *H01M 8/0247* (2013.01); *H01M 10/0413* (2013.01); *H01M 10/0431* (2013.01); *H01M 10/0436* (2013.01); *H01M 10/0445* (2013.01); *Y02E 60/13* (2013.01)

(58) Field of Classification Search
None
See application file for complete search history.

*Primary Examiner* — Daniel S Gatewood
(74) *Attorney, Agent, or Firm* — Bacon & Thomas, PLLC

(57) ABSTRACT

The present invention provides an electricity storing/discharging device with single-layer folding covering and packaging single input/output electric conductive interface having electrode plate pair with multiple-sided electric conductive terminals, which is applied in a specified single-layer folding covering and packaging structure having electrode plate pair with multiple-sided electric conductive terminals, so the electrode plate pair with multiple-sided electric conductive terminals after being covered and packaged is able to be structured as a single input/output electric conductive interface through single input/output electric conductive terminal having positive and negative polarity for transferring electric energy to the exterior.

16 Claims, 10 Drawing Sheets

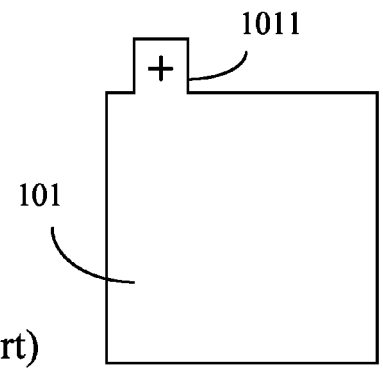
Fig. 1 (Prior Art)
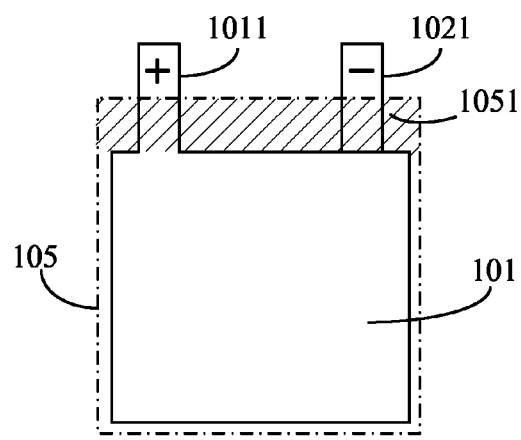 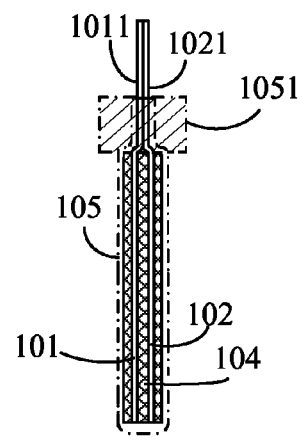
Fig. 2 (Prior Art)   Fig. 3 (Prior Art)
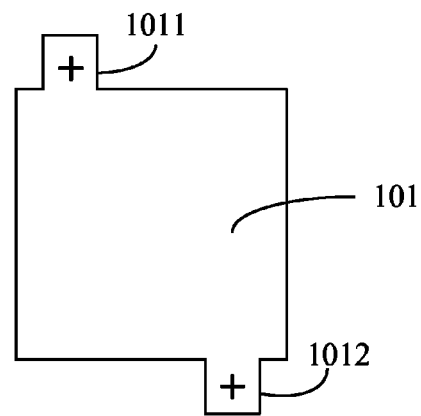
Fig.4 (Prior Art)

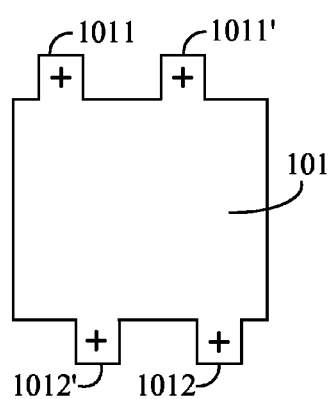
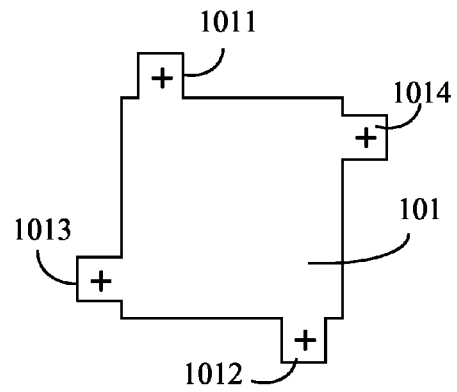
Fig. 5 (Prior Art)  Fig.6 (Prior Art)
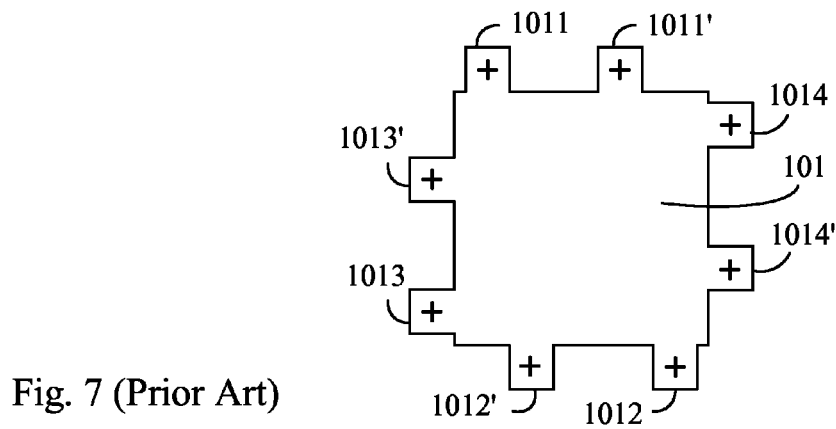
Fig. 7 (Prior Art)
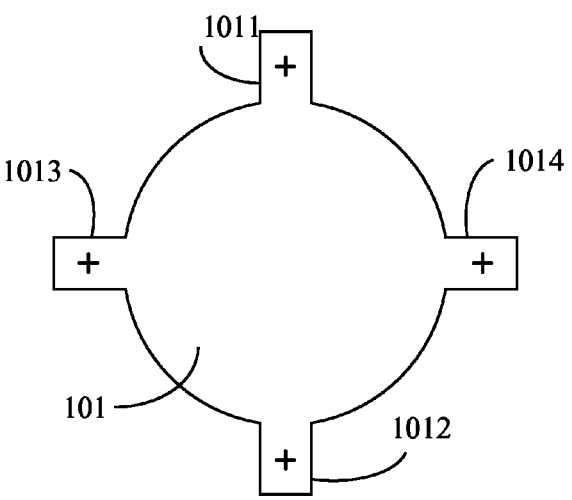
Fig. 8 (Prior Art)

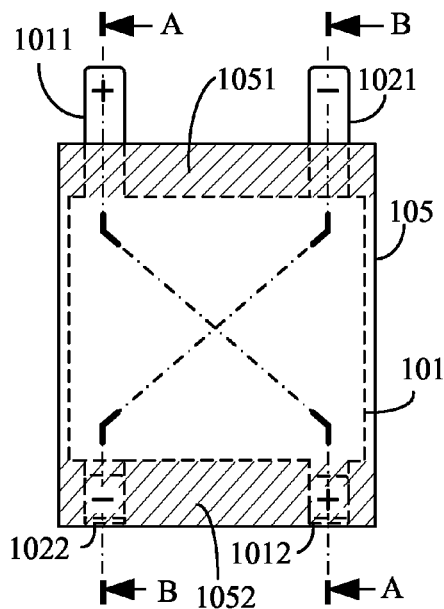
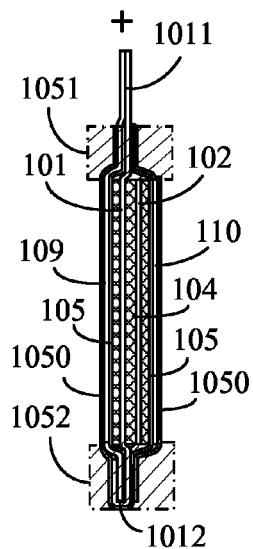
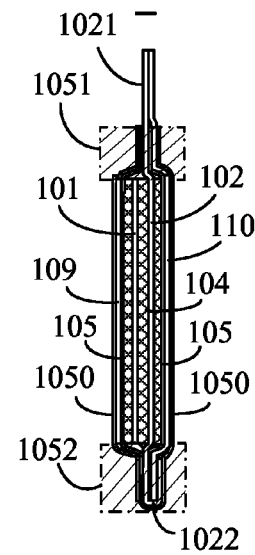
Fig. 9     Fig. 10     Fig. 11
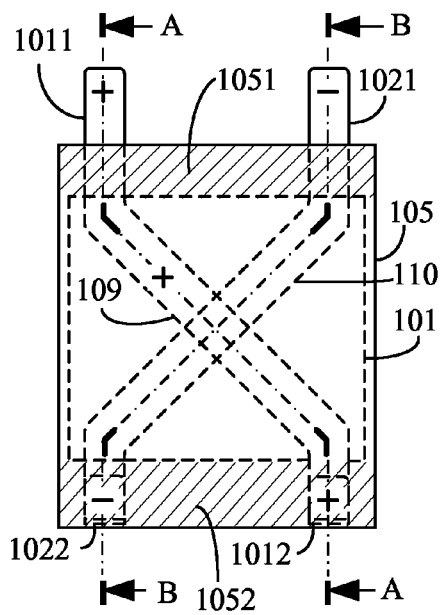
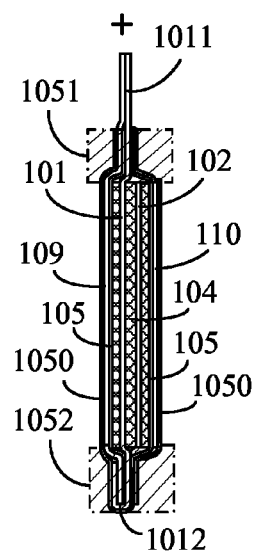
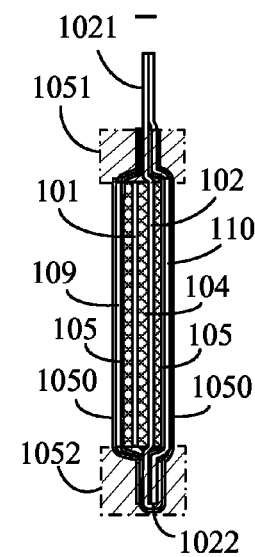
Fig. 12     Fig. 13     Fig. 14

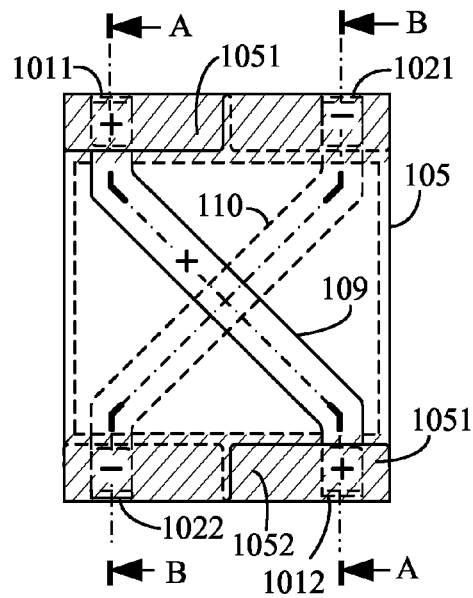
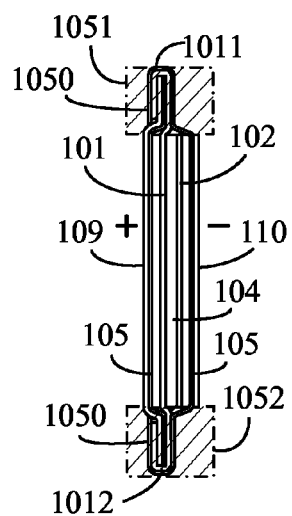
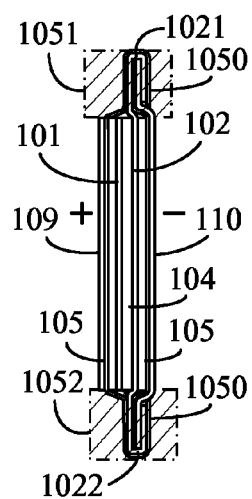
Fig. 21　　　　　Fig. 22　　　　　Fig. 23
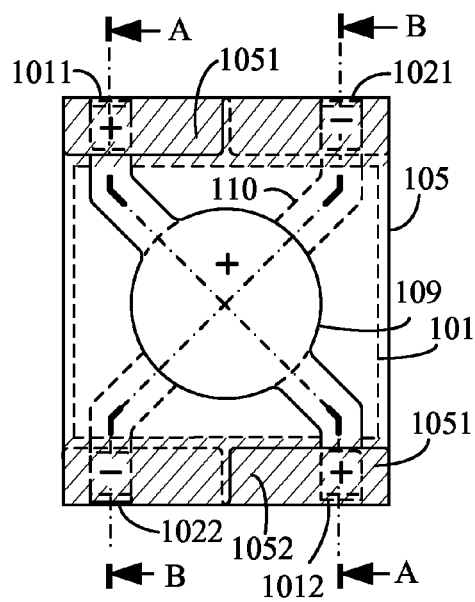
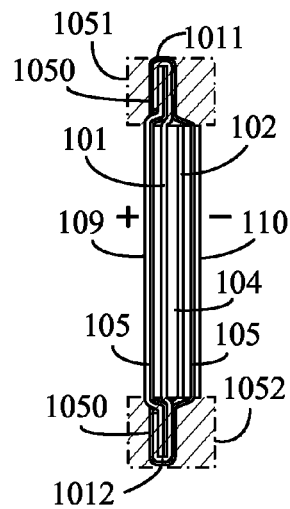
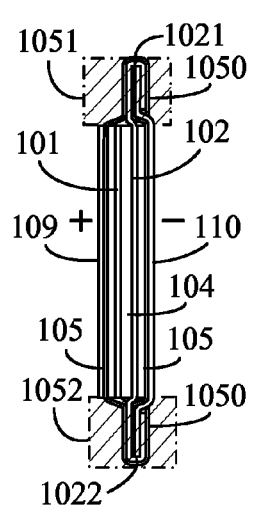
Fig. 24　　　　　Fig. 25　　　　　Fig. 26

US 10,014,117 B2

ELECTRICITY STORING/DISCHARGING DEVICE WITH SINGLE-LAYER FOLDING COVERING AND PACKAGING SINGLE INPUT/OUTPUT ELECTRIC CONDUCTIVE INTERFACE HAVING ELECTRODE PLATE PAIR WITH MULTIPLE-SIDED ELECTRIC CONDUCTIVE TERMINALS

BACKGROUND OF THE INVENTION (a) Field of the Invention

The present invention provides an electricity storing/discharging device with single-layer folding covering and packaging single input/output electric conductive interface having electrode plate pair with multiple-sided electric conductive terminals, which is applied in a specified single-layer folding covering and packaging structure having electrode plate pair with multiple-sided electric conductive terminals, so the electrode plate pair with multiple-sided electric conductive terminals after being covered and packaged is able to be structured as a single input/output electric conductive interface through single input/output electric conductive terminal having positive and negative polarity for transferring electric energy to the exterior, or further to be connected in series, in parallel, in series then in parallel for forming as a module applicable for various requirements.

(b) Description of the Prior Art

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means.

SUMMARY OF THE INVENTION

In a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means;

The present invention provides an electricity storing/discharging device with single-layer folding covering and packaging single input/output electric conductive interface having electrode plate pair with multiple-sided electric conductive terminals, which is applied in a specified single-layer folding covering and packaging structure having electrode plate pair with multiple-sided electric conductive terminals, so the electrode plate pair with multiple-sided electric conductive terminals after being covered and packaged is able to be structured as a single input/output electric conductive interface through single input/output electric conductive terminal having positive and negative polarity for transferring electric energy to the exterior, or further to be connected in series, in parallel, in series then in parallel for forming as a module applicable for various requirements.

BRIEF DESCRIPTION OF THE DRAWINGS

FIG. 1 is a schematic structural view showing a conventional electrode plate having single-sided electric energy transferring terminal.

FIG. 2 is a schematic structural view showing a conventional electrode plate pair with single-sided electric energy transferring terminal being formed as an electricity storing/discharging cell.

FIG. 3 is a lateral cross sectional view of FIG. 2.

FIG. 4 is the first embodiment showing a conventional electrode plate having multiple-sided electric energy transferring terminals.

FIG. 5 is the second embodiment showing a conventional electrode plate having multiple-sided electric energy transferring terminals.

FIG. 6 is the third embodiment showing a conventional electrode plate having multiple-sided electric energy transferring terminals.

FIG. 7 is the fourth embodiment showing a conventional electrode plate having multiple-sided electric energy transferring terminals.

FIG. 8 is an embodiment showing a conventional circular electrode plate having electric energy transferring terminals.

FIG. 9 is a schematic structural view showing one side of the electrode plate pair having a rectangular sheet-like lateral positive electric conductive member (109) and a lateral negative electric conductive member (110) being provided with the input/output electric conductive terminal having positive and negative polarity for being structured as a single input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

FIG. 12 is a schematic structural view showing one side of the electrode plate pair having the strip-like lateral positive electric conductive member (109) and the lateral negative electric conductive member (110) being provided with the input/output electric conductive terminals having positive and negative polarity for being structured as the single input/output electric conductive interface according to one embodiment of the present invention.

FIG. 13 is a lateral cross sectional view of FIG. 12 taken along A-A.

FIG. 14 is a lateral cross sectional view of FIG. 12 taken along B-B.

FIG. 21 is a schematic structural view showing one side of the electrode plate pair having the strip-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single input/output electric conductive interface according to one embodiment of the present invention.

FIG. 22 is a lateral cross sectional view of FIG. 21 taken along A-A.

FIG. 23 is a lateral cross sectional view of FIG. 21 taken along B-B.

FIG. 24 is a schematic structural view showing one side of the electrode plate pair having the circular sheet-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single input/output electric conductive interface according to one embodiment of the present invention.

FIG. 25 is a lateral cross sectional view of FIG. 24 taken along A-A.

FIG. 26 is a lateral cross sectional view of FIG. 24 taken along B-B.

DESCRIPTION OF MAIN COMPONENT SYMBOLS

Figure 15:
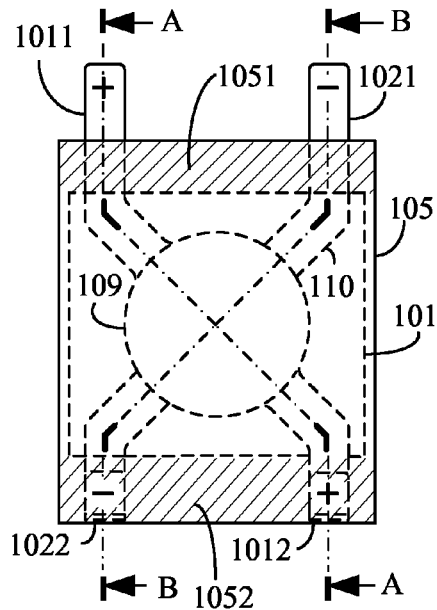
FIG. 15 is a schematic structural view showing one side of the electrode plate pair having the circular sheet-like lateral positive electric conductive member (109) and the lateral negative electric conductive member (110) being provided with the input/output electric conductive terminals having positive and negative polarity for being structured as the single input/output electric conductive interface according to one embodiment of the present invention.

101: Positive electrode plate
102: Negative electrode plate
104: Separator
105: Insulation package enclosed member
1050: Folding covering and packing segment
1051、1052: Sealing zone
109: Lateral positive electric conductive member
110: Lateral negative electric conductive member
120: Housing
1011、1011'、1012、1012'、1013、1013'、1014、1014'、1021、1022: Electric conductive terminal for inputting/outputting electric energy

DETAILED DESCRIPTION OF THE PREFERRED EMBODIMENTS

A electrode plate is a fundamental component for structuring a primary cell or a rechargeable secondary cell or a capacitor or a super capacitor and a fuel cell for outputting electric energy, the configuration thereof is often composed of electrode plates having various geometric shapes, and at least a positive electrode plate and at least a negative electrode plate having the same or different quantity are formed as an electrode plate pair so as to structure an electricity storing/discharging cell, and at least two electricity storing/discharging cells are adopted for being homopolarity connected in parallel or normal-polarity connected in series or being connected in series then in parallel or connected in parallel then in series for forming as a module applicable for various requirements.

It is well known that the electrode plate applied in the above-mentioned primary cell or rechargeable secondary cell or capacitor or super capacitor and fuel cell for outputting electric energy is mainly formed in a circular or rectangular shape or other geometric shapes according to actual needs, and the electrode plate and the electric conductive terminal for inputting/outputting electric energy are often exposed outside a sealed housing, when the electrode plate pair with multiple-sided input/output electric conductive terminals are adopted, an additional electric conductive member has to be provided for connection, as such, inconvenience in connection is caused when a soft package material is adopted.

The present invention provides an electricity storing/discharging device with single-layer folding covering and packaging single input/output electric conductive interface having electrode plate pair with multiple-sided electric conductive terminals, which is applied in a specified single-layer folding covering and packaging structure having electrode plate pair with multiple-sided electric conductive terminals, so the electrode plate pair with multiple-sided electric conductive terminals after being covered and packaged is able to be structured as a single input/output electric conductive interface through single input/output electric conductive terminal having positive and negative polarity for transferring electric energy to the exterior, or further to be connected in series, in parallel, in series then in parallel for forming as a module applicable for various requirements.

According to the electricity storing/discharging device with single-layer folding covering and packaging single input/output electric conductive interface having electrode plate pair with multiple-sided electric conductive terminals, the electrode plate pair with multiple-sided input/output electric conductive terminals and the soft package material or rigid package material are able to be adopted for forming a single-layer folding covering and packaging structure so as to be structured as a specific package structure with single input/output electric conductive interface.

Moreover, in a sealing-type package structure for the electrode plate pair of a conventional electricity storing/discharging device, the input/output electric conductive terminals having positive and negative polarity of the electrode plate pair are processed with a single-sided sealing package operation, then the input/output electric conductive terminals having positive and negative polarity are outwardly extended for forming a single-sided input/output electric conductive interface; however, the above-mentioned structural configuration is unable to allow the electrode plate pair with multiple-sided input/output electric conductive terminals to input/output electric energy to the exterior with a multiple-direction means; a positive electrode plate is adopted for illustration (the same illustration can be applied to a negative electrode plate therefore not provided), as followings:

FIG. 1 is a schematic structural view showing a conventional electrode plate having single-sided electric energy transferring terminal.

As shown in FIG. 1, the electrode plate formed in a quadrilateral shape is provided as an example, and the main configuration is that one side of the quadrilateral electrode plate is outwardly extended for forming the electric conductive terminal for inputting/outputting electric energy.

FIG. 2 is a schematic structural view showing a conventional electrode plate pair with single-sided electric energy transferring terminal being formed as an electricity storing/discharging cell.

FIG. 3 is a lateral cross sectional view of FIG. 2.

As shown in FIG. 2 and FIG. 3, the main configuration is that a quadrilateral positive electrode plate (101) having single-sided electric conductive terminal for inputting/outputting electric energy (1011) and a negative electrode plate (102) having single-sided electric conductive terminal for inputting/outputting electric energy (1021) are provided, and an separator is provided between the positive and the negative electrode plates, and the separator is directly installed or clamped at the exterior after an electrolyte solution or an electrolyte material is filled in then is disposed in an insulation package enclose member (105), and the electric conductive terminals for inputting/outputting electric energy (1011), (1012) are outwardly extended through a sealing zone (1051) from another side of the insulation package enclose member (105).

FIG. 4 is the first embodiment showing a conventional electrode plate having multiple-sided electric energy transferring terminals.

As shown in FIG. 4, the main configuration is that end portions defined at two opposite sides of the quadrilateral positive electrode plate (101) are respectively formed with an electric conductive terminal for inputting/outputting electric energy (1011), (1012).

FIG. 5 is the second embodiment showing a conventional electrode plate having multiple-sided electric energy transferring terminals.

As shown in FIG. 5, the main configuration is that two opposite sides of the quadrilateral positive electrode plate (101) are respectively formed with two electric conductive terminals for inputting/outputting electric energy (1011), (1011') and two electric conductive terminals for inputting/outputting electric energy (1012), (1012'), wherein the electric conductive terminals for inputting/outputting electric energy (1011), (1011') formed at one side and the electric conductive terminals for inputting/outputting electric energy (1012), (1012') formed at the opposite side are staggeringly arranged.

FIG. 6 is the third embodiment showing a conventional electrode plate having multiple-sided electric energy transferring terminals.

As shown in FIG. 6, four sides of the quadrilateral positive electrode plate (101) are respectively formed with an electric conductive terminal for inputting/outputting electric energy (1011), (1012), (1013), (1014), wherein the electric conductive terminals for inputting/outputting electric energy arranged at opposite sides are staggeringly arranged.

FIG. 7 is the fourth embodiment showing a conventional electrode plate having multiple-sided electric energy transferring terminals.

As shown in FIG. 7, a first side of the quadrilateral positive electrode plate (101) is formed with two electric conductive terminals for inputting/outputting electric energy (1011), (1011'), a second side thereof is formed with two electric conductive terminals for inputting/outputting electric energy (1012), (1012'), a third side thereof is formed with two electric conductive terminals for inputting/outputting electric energy (1013), (1013') and a fourth side thereof is formed with two electric conductive terminals for inputting/outputting electric energy (1014), (1014'), wherein the electric conductive terminals for inputting/outputting electric energy arranged at opposite sides are staggeringly arranged.

FIG. 8 is an embodiment showing a conventional circular electrode plate having electric energy transferring terminals.

As shown in FIG. 8, the main configuration is that the periphery of the circular electrode plate is radially formed with electric conductive terminals for inputting/outputting electric energy (1011), (1012), (1013), (1014).

Other various similar geometric shapes have substantially the same feature, therefore no further illustration is provided.

The present invention discloses an electricity storing/discharging device with single-layer folding covering and packaging single input/output electric conductive interface having electrode plate pair with multiple-sided electric conductive terminals, which is applied in a specified single-layer folding covering package structure having electrode plate pair with multiple-sided electric conductive terminals, so the electrode plate pair with multiple-sided electric conductive terminals after being covered and packaged is able to be structured as a single input/output electric conductive interface through single input/output electric conductive terminal having positive and negative polarity for transferring electric energy to the exterior, or further to be connected in series, in parallel or in series and parallel for forming as a module applicable for various requirements; because the shapes and types of electrode plates can be varied according to actual needs, a rectangular electrode plate is adopted herein for illustration, as followings:

FIG. 9 is a schematic structural view showing one side of the electrode plate pair having a rectangular sheet-like lateral positive electric conductive member (109) and a lateral negative electric conductive member (110) being provided with the input/output electric conductive terminal having positive and negative polarity for being structured as a single input/output electric conductive interface according to one embodiment of the present invention.

FIG. 10 is a lateral cross sectional view of FIG. 9 taken along A-A.

FIG. 11 is a lateral cross sectional view of FIG. 9 taken along B-B.

As shown in FIG. 9, FIG. 10 and FIG. 11, mainly consists:

positive electrode plate (101): composed of one or more than one of sheet-like or film-like quadrilateral positive electrode plates, opposite sides of the positive electrode plate are respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, opposite sides of the negative electrode plate are respectively formed with at least an electric conductive terminal for inputting/outputting electric energy, and the surface of the negative electrode plate is provided with an electrochemical material;

separator (104): formed by a thin film having microporous or porous property and mainly made of PP (polypropylene) or PE (polyethylene), disposed between the positive and the negative electrode plates, and the main function thereof is to isolate the positive and the negative electrode plates for preventing the self-discharge of the cell and the short circuit between the two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are conductive electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one opening of the insulation package enclosed member (105) allows the electric conductive terminal for inputting/outputting electric energy (1011) and the electric conductive terminal for inputting/outputting electric energy (1021) to be exposed, and the insulation package enclosed member (105) is processed for forming a sealing zone (1051) so as to seal the portions of the electric conductive terminal for inputting/outputting electric energy (1011) and the electric conductive terminal for inputting/outputting electric energy (1021) defined close to the electrode plate, and the distal ends of the electric conductive terminal for inputting/outputting electric energy (1011) and the electric conductive terminal for inputting/outputting electric energy (1021) are exposed at the same side for being structured as the single input/output electric conductive interface; the interior of the insulation package enclosed member (105) allows an electrolyte solution or an electrolyte material to be filled in; the lateral positive electric conductive member (109) is disposed at one side defined at the exterior of the insulation package enclosed member (105) and electrically connected between the electric conductive terminal for inputting/outputting electric energy (1011) and the electric conductive terminal for inputting/outputting electric energy (1012), the lateral negative electric conductive member (110) is disposed at another side defined at the exterior of the insulation package enclosed member (105) and electrically connected between the electric conductive terminal for inputting/outputting electric energy (1021) and the electric conductive terminal for inputting/outputting electric energy (1022); another end of the insulation package enclosed member (105) is formed with two folding covering and packaging segments (1050) for allowing the electric conductive terminal for inputting/outputting electric energy (1012), the electric conductive terminal for inputting/outputting electric energy (1022) at the other end and the insulation package enclosed member (105) to be processed for forming a sealing zone (1052) so as to seal the electric conductive terminal for inputting/outputting electric energy (1012) and the electric conductive terminal for inputting/outputting electric energy (1022), then the two folding covering and packaging segments (1050) are respectively and upwardly folded along two sides defined at the exterior of the sealing zone (1052) of the insulation package enclosed member (105) for respectively sealing and covering the lateral positive electric conductive member (109) and the lateral negative electric conductive member (110) and further upwardly extended for being sealed in the sealing zone (1051) with the portions of the electric conductive terminal for inputting/outputting electric energy (1011) and the electric conductive terminal for inputting/outputting electric energy (1021) defined close to the electrode plate, wherein the electric conductive terminal for inputting/outputting electric energy (1012) is electrically connected to one end of the lateral positive electric conductive member (109), and then through the other end of the lateral positive electric conductive member (109) electrically connected to the electric conductive terminal for inputting/outputting electric energy (1011) thereby electrical conductively forming a parallel connection with positive polarity; the electric conductive terminal for inputting/outputting electric energy (1022) is electrically connected to one end of the lateral negative electric conductive member (110), and then through the other end of the lateral negative electric conductive member (110) electrically connected to the electric conductive terminal for inputting/outputting electric energy (1021) thereby electrical conductively forming a parallel connection with negative polarity, so the electricity storing/discharging device with single-layer folding covering and packaging single input/output electric conductive interface having electrode plate pair with multiple-sided electric conductive terminals is structured, and the exposed distal portions of the electric conductive terminal for inputting/outputting electric energy (1011) and the electric conductive terminal for inputting/outputting electric energy (1021) are structured as the single input/output electric conductive interface;

lateral positive electric conductive member (109): made of an electric conductive material and disposed at one side of the insulation package enclosed member (105);

lateral negative electric conductive member (110): made of an electric conductive material and disposed at another side of the insulation package enclosed member (105);

The above-mentioned lateral positive electric conductive member (109) and the lateral negative electric conductive member (110) include being composed of an electric conductive member formed in a rectangular sheet-like, or strip-like or circular sheet-like status, and the top and the bottom ends thereof are respectively extended with an electric conductive strip, the electric conductive strips respectively extended from the top and the bottom ends of the lateral positive electric conductive member (109) are then respectively and electrically connected in parallel with the electric conductive terminal for inputting/outputting electric energy (1011) and the electric conductive terminal for inputting/outputting electric energy (1012) having positive polarity, and the electric conductive strips respectively extended from the top and the bottom ends of the lateral negative electric conductive member (110) are then respectively and electrically connected in parallel with the electric conductive terminal for inputting/outputting electric energy (1021) and the electric conductive terminal for inputting/outputting electric energy (1022) having negative polarity, and the exposed portions of the electric conductive terminal for inputting/outputting electric energy (1011) and the electric conductive terminal for inputting/outputting electric energy (1021) are structured as the single input/output electric conductive interface;

FIG. 12 is a schematic structural view showing one side of the electrode plate pair having the strip-like lateral positive electric conductive member (109) and the lateral negative electric conductive member (110) being provided with the input/output electric conductive terminals having positive and negative polarity for being structured as the single input/output electric conductive interface according to one embodiment of the present invention.

FIG. 13 is a lateral cross sectional view of FIG. 12 taken along A-A.

FIG. 14 is a lateral cross sectional view of FIG. 12 taken along B-B.

As shown in FIG. 12, FIG. 13 and FIG. 14, one side of the electrode plate pair having the strip-like lateral positive electric conductive member (109) and the lateral negative electric conductive member (110) are provided with the input/output electric conductive terminals having positive and negative polarity for being structured as the single input/output electric conductive interface. FIG. 15 is a schematic structural view showing one side of the electrode plate pair having the circular sheet-like lateral positive electric conductive member (109) and the lateral negative electric conductive member (110) being provided with the input/output electric conductive terminals having positive and negative polarity for being structured as the single input/output electric conductive interface according to one embodiment of the present invention.

Figure 16:
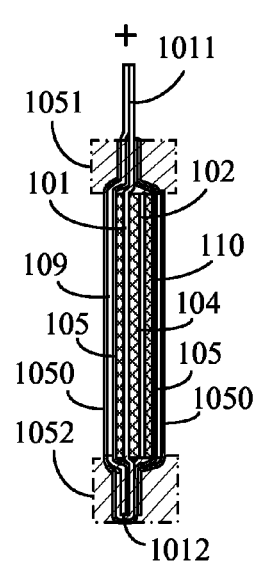
FIG. 16 is a lateral cross sectional view of FIG. 15 taken along A-A.

FIG. 16 is a lateral cross sectional view of FIG. 15 taken along A-A.

Figure 17:
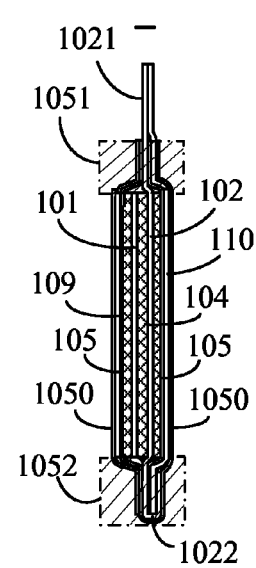
FIG. 17 is a lateral cross sectional view of FIG. 15 taken along B-B.

FIG. 17 is a lateral cross sectional view of FIG. 15 taken along B-B.

As shown in FIG. 15, FIG. 16 and FIG. 17, one side of the electrode plate pair having the circular sheet-like lateral positive electric conductive member (109) and the lateral negative electric conductive member (110) are provided with the input/output electric conductive terminals having positive and negative polarity for being structured as the single input/output electric conductive interface.

According to the above-mentioned embodiments, the lateral positive electric conductive member (109) and the lateral negative electric conductive member (110) at two sides of the electricity storing/discharging device with single-layer folding covering and packaging single input/output electric conductive interface having electrode plate pair with multiple-sided electric conductive terminals can be served as an input/output electric conductive interface for being individually used, or connected in series, in parallel or in series and parallel, the configuration includes:

exposed electric conductive surfaces of a lateral positive electric conductive member (109) and an opposite lateral negative electric conductive member (110) are directly formed as the input/output electric conductive interface for being individually used, or connected in series, in parallel or in series and parallel; or the exposed surface of the lateral positive electric conductive member (109) is provided with a lateral positive auxiliary electric conductive member (1091), and the exposed surface of the lateral negative electric conductive member (110) is provided with a lateral negative auxiliary electric conductive member (1101), thereby structuring the input/output electric conductive interface for being individually used, or connected in series, in parallel or in series and parallel; or one or more locations defined at the mid portion of the lateral positive electric conductive member (109) are formed with an outwardly-protruded structure and one or more locations defined at the mid portion of the lateral negative electric conductive member (110) are formed with an outwardly-protruded structure, thereby structuring the input/output electric conductive interface for being individually used, or connected in series, in parallel or in series and parallel.

Figure 18:
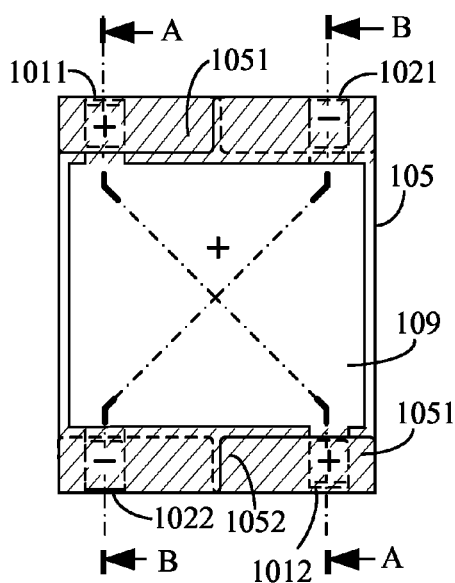
FIG. 18 is a schematic structural view showing one side of the electrode plate pair having the rectangular sheet-like lateral positive electric conductive member (109) and the lateral negative electric conductive member (110) being served as the input/output electric conductive terminal having positive polarity, and the other side thereof being served as the input/output electric conductive terminal having negative polarity thereby structuring the single input/output electric conductive interface according to one embodiment of the present invention.

FIG. 18 is a schematic structural view showing one side of the electrode plate pair having the rectangular sheet-like lateral positive electric conductive member (109) and the lateral negative electric conductive member (110) being served as the input/output electric conductive terminal having positive polarity, and the other side thereof being served as the input/output electric conductive terminal having negative polarity thereby structuring the single input/output electric conductive interface according to one embodiment of the present invention.

Figure 19:
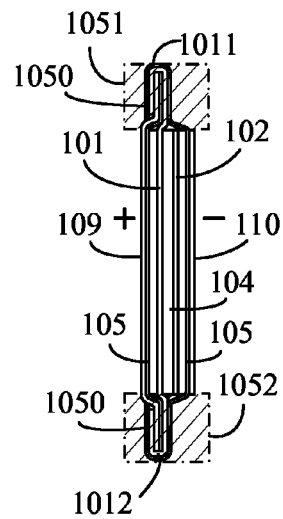
FIG. 19 is a lateral cross sectional view of FIG. 18 taken along A-A.

FIG. 19 is a lateral cross sectional view of FIG. 18 taken along A-A.

Figure 20:
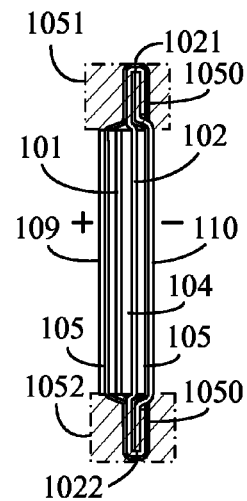
FIG. 20 is a lateral cross sectional view of FIG. 18 taken along B-B.

FIG. 20 is a lateral cross sectional view of FIG. 18 taken along B-B.

As shown in FIG. 18, FIG. 19 and FIG. 20, one side of the electrode plate pair having the rectangular sheet-like lateral positive electric conductive member (109) and the lateral negative electric conductive member (110) is served as the input/output electric conductive terminal having positive polarity, and the other side thereof is served as the input/output electric conductive terminal having negative polarity thereby structuring the single input/output electric conductive interface; mainly consists:

positive electrode plate (101): composed of one or more than one of sheet-like or film-like quadrilateral positive electrode plates, each of the opposite sides of the positive electrode plate is respectively formed with at least an electric conductive terminal for inputting/outputting electric energy, and the surface of the positive electrode plate is provided with an electrochemical material;

negative electrode plate (102): composed of one or more than one of sheet-like or film-like quadrilateral negative electrode plates, each of the opposite sides of the negative electrode plate is respectively formed with at least an electric conductive terminal for inputting/outputting electric energy, and the surface of the negative electrode plate is provided with an electrochemical material;

separator (104): formed by a thin film having microporous or porous property and mainly made of PP or PE, disposed between the positive and the negative electrode plates, and the main function thereof is to isolate the positive and the negative electrode plates for preventing the self-discharge of the cell and the short circuit between two polarities, and installed between electrode plates having different polarities and installed at a lateral side of the electrode plate according to actual needs;

Opposite sides of the quadrilateral electrode plate are respectively and outwardly extended with one or more input/output terminals for transferring electric energy, and the separator is disposed between one or more of the positive electrode plates and one or more of the negative electrode plates having the same or different quantity, and the electrode plates having different polarities are staggeringly stacked for forming as an electrode plate pair; and when a plurality of the electrode plates having the same polarity are provided, the input/output terminals having the same polarity for transferring electric energy and formed at the same side of each of the electrode plates having the same polarity are electrically connected in parallel;

insulation package enclosed member (105): made of a soft or rigid package material having insulation property such as an aluminum laminated film, the periphery of the insulation package enclosed member (105) is formed in a sealed hollow sleeve status, and openings formed at two sides allow the positive electrode plate (101) and the negative electrode plate (102) having the separator (104) clamped in between to be disposed, one distal end of the insulation package enclosed member (105) is formed with a folding covering and packing segment (1050); through the folding covering and packaging segment (1050) upwardly protruded from the insulation package enclosed member (105) which serves as the inner insulation for the lateral negative electric conductive member (110), and the upward extending segment of the insulation package enclosed member (105) which covers the inner insulation of the lateral positive electric conductive member (109) are processed for forming the sealing zone (1051), the electric conducting connection portion of the electric conductive terminal for inputting/outputting electric energy (1011) and the upward extending segment of the lateral positive electric conductive member (109) is enabled to be sealed; and through the folding covering and packaging segment (1050) upwardly protruded from the insulation package enclosed member (105) which serves as the inner insulation for the lateral positive electric conductive member (109), and the upward extending segment of the insulation package enclosed member (105) which covers the inner insulation of the lateral negative electric conductive member (110) are processed for forming the sealing zone (1051), the electric conducting connection portion of the electric conductive terminal for inputting/outputting electric energy (1021) and the upward extending segment of the lateral negative electric conductive member (110) is enabled to be sealed; the interior of the insulation package enclosed member (105) allows an electrolyte solution or an electrolyte material to be filled in; and through the folding covering and packaging segment (1050) downwardly protruded from the insulation package enclosed member (105) which serves as the inner insulation for the lateral negative electric conductive member (110), and the downward extending segment of the insulation package enclosed member (105) which covers the inner insulation of the lateral positive electric conductive member (109) are processed for forming the sealing zone (1052), the electric conducting connection portion of the electric conductive terminal for inputting/outputting electric energy (1012) and the downward extending segment of the lateral positive electric conductive member (109) is enabled to be sealed; and through the folding covering and packaging segment (1050) downwardly protruded from the insulation package enclose member (105) which serves as the inner insulation for the lateral positive electric conductive member (109), and the downward extending segment of the insulation package enclose member (105) which covers the inner insulation of the lateral negative electric conductive member (110) are processed for forming the sealing zone (1052), the electric conducting connection portion of the electric conductive terminal for inputting/outputting electric energy (1022) and the downward extending segment of the lateral negative electric conductive member (110) is enabled to be sealed, wherein the electric conductive terminal for inputting/outputting electric energy (1012) is electrically connected to one end of the lateral positive electric conductive member (109), and then through the other end of the lateral positive electric conductive member (109) electrically connected to the electric conductive terminal for inputting/outputting electric energy (1011), thereby electrical conductively forming a parallel connection with positive polarity; the electric conductive terminal for inputting/outputting electric energy (1022) is electrically connected to one end of the lateral negative electric conductive member (110), and then through the other end of the lateral negative electric conductive member (110) electrically connected to the electric conductive terminal for inputting/outputting electric energy (1021), thereby electrical conductively forming a parallel connection with negative polarity, and the exposed electric conductive surface of the lateral positive electric conductive member (109) and the exposed electric conductive surface of the lateral negative electric conductive member (110) are structured for forming as the single input/output electric conductive interface;

lateral positive electric conductive member (109): made of an electric conductive material and served as the input/output electric conductive terminal having positive polarity;

lateral negative electric conductive member (110): made of an electric conductive material and served as the input/output electric conductive terminal having negative polarity;

The above-mentioned lateral positive electric conductive member (109) and the lateral negative electric conductive member (110) include being composed of an electric conductive member formed in a rectangular sheet-like, or strip-like or circular sheet-like status, and the top and the bottom ends thereof are respectively extended with an electric conductive strip, and the electric conductive strips respectively extended from the top and the bottom ends of the lateral positive electric conductive member (109) are then respectively and electrically connected in parallel with the electric conductive terminal for inputting/outputting electric energy (1011) and the electric conductive terminal for inputting/outputting electric energy (1012) having positive polarity, and the electric conductive strips respectively extended from the top and the bottom ends of the lateral negative electric conductive member (110) are then respectively and electrically connected to the electric conductive terminal for inputting/outputting electric energy (1021) and the electric conductive terminal for inputting/outputting electric energy (1022) having negative polarity, and the exposed electric conductive surface of the lateral positive electric conductive member (109) and the exposed electric conductive surface of the lateral negative electric conductive member (110) are structured for forming as the single input/output electric conductive interface.

FIG. 21 is a schematic structural view showing one side of the electrode plate pair having the strip-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single input/output electric conductive interface according to one embodiment of the present invention.

FIG. 22 is a lateral cross sectional view of FIG. 21 taken along A-A.

FIG. 23 is a lateral cross sectional view of FIG. 21 taken along B-B.

As shown in FIG. 21, FIG. 22 and FIG. 23, one side of the electrode plate pair having the strip-like lateral positive electric conductive member (109) and the lateral negative electric conductive member (110) is served as the input/output electric conductive terminal having positive polarity, and the other end thereof is served as the input/output electric conductive terminal having negative polarity thereby structuring the single input/output electric conductive interface.

FIG. 24 is a schematic structural view showing one side of the electrode plate pair having the circular sheet-like lateral positive electric conductive member (109) and the lateral negative electric conductive member (110) being served as the input/output electric conductive terminal having positive polarity, and the other end thereof being served as the input/output electric conductive terminal having negative polarity thereby structuring the single input/output electric conductive interface according to one embodiment of the present invention.

FIG. 25 is a lateral cross sectional view of FIG. 24 taken along A-A.

FIG. 26 is a lateral cross sectional view of FIG. 24 taken along B-B.

As shown in FIG. 24, FIG. 25 and FIG. 26, one side of the electrode plate pair having the circular sheet-like lateral positive electric conductive member (109) and the lateral negative electric conductive member (110) is served as the input/output electric conductive terminal having positive polarity, and the other end thereof is served as the input/output electric conductive terminal having negative polarity thereby structuring the single input/output electric conductive interface according to one embodiment of the present invention.

Figure 27:
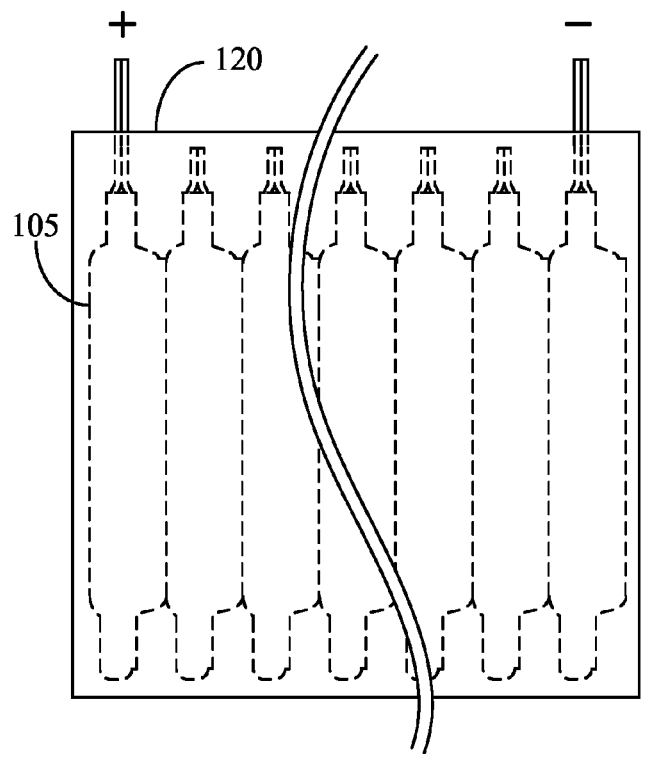
FIG. 27 is a schematic structural view showing the electricity storing/discharging cells being disposed inside the housing (120) for forming as a module according to the present invention.

After the plural electricity storing/discharging cells are structured, the electricity storing/discharging cells can be individually operated and combined through electric conductive members, at least one or more of the electricity storing/discharging cells are disposed in the interior of one or more of the housings so as to be collected for forming as a modularized structure which is connected through the electric conductive members or the input/output electric conductive interface of each electricity storing/discharging device for transferring electric energy;

FIG. 27 is a schematic structural view showing the electricity storing/discharging cells being disposed inside the housing (120) for forming as a module according to the present invention.

Figure 28:
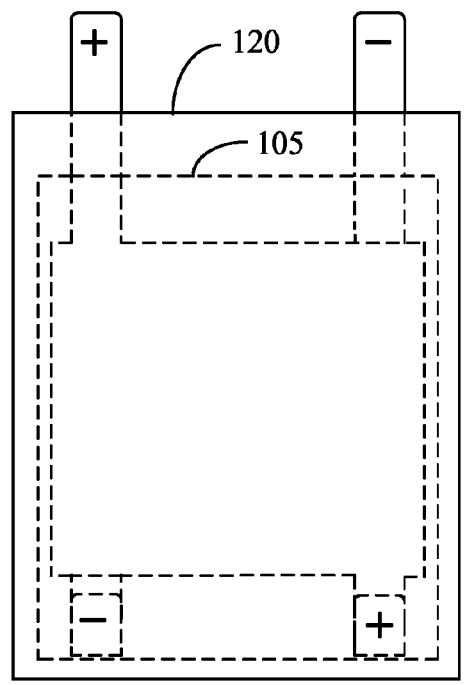
FIG. 28 is a lateral structural view of FIG. 27.

FIG. 28 is a lateral structural view of FIG. 27.

As shown in FIG. 27 and FIG. 28, at least one or more of the electricity storing/discharging cells are disposed inside the housing (120), wherein:

housing (120): made of a soft flexible material or a rigid material such as stainless steel.

Figure 29:
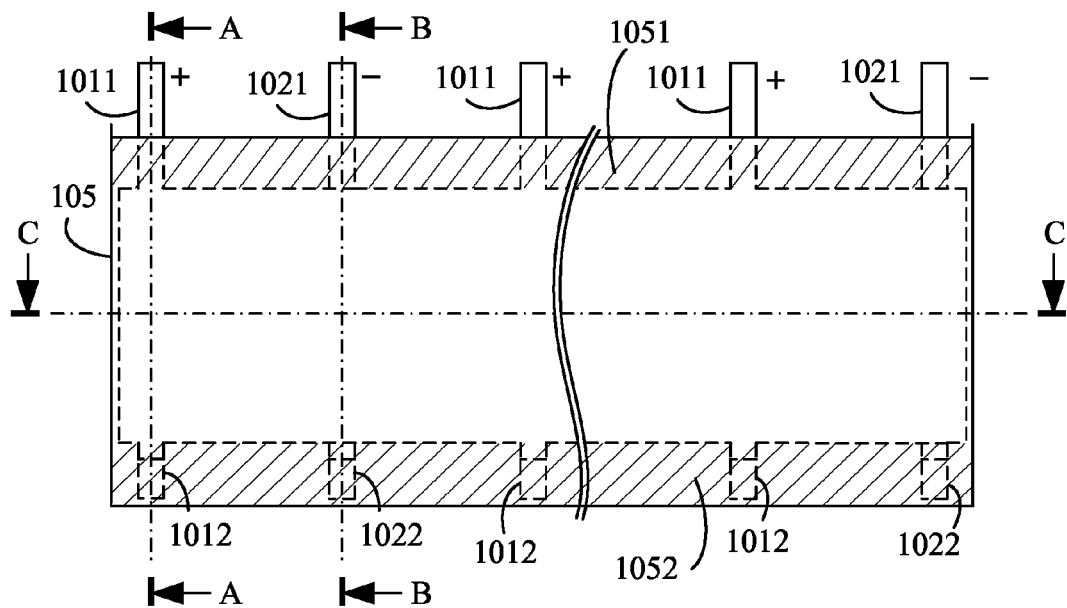
FIG. 29 is a structural unfold view of the electrode plate formed in rolling structure showing the single-sided input/output electric conductive terminal and the lateral positive electric conductive member (109) and the lateral negative electric conductive member (110) of the electrode plate pair being sealed in a single-layer insulation status for forming as the rolling structure, wherein the input/output electric conductive terminal at one side being served as the single input/output electric conductive interface according one embodiment of the present invention.

According to the present invention, the electricity storing/discharging device with single-layer folding covering and packaging single input/output electric conductive interface having electrode plate pair with multiple-sided electric conductive terminals can be further formed as a rolling structure, illustrated as followings:

FIG. 29 is a structural unfold view of the electrode plate formed in rolling structure showing the single-sided input/output electric conductive terminal and the lateral positive electric conductive member (109) and the lateral negative electric conductive member (110) of the electrode plate pair being sealed in a single-layer insulation status for forming as the rolling structure, wherein the input/output electric conductive terminal at one side being served as the single input/output electric conductive interface according one embodiment of the present invention.

Figures 30, 31:
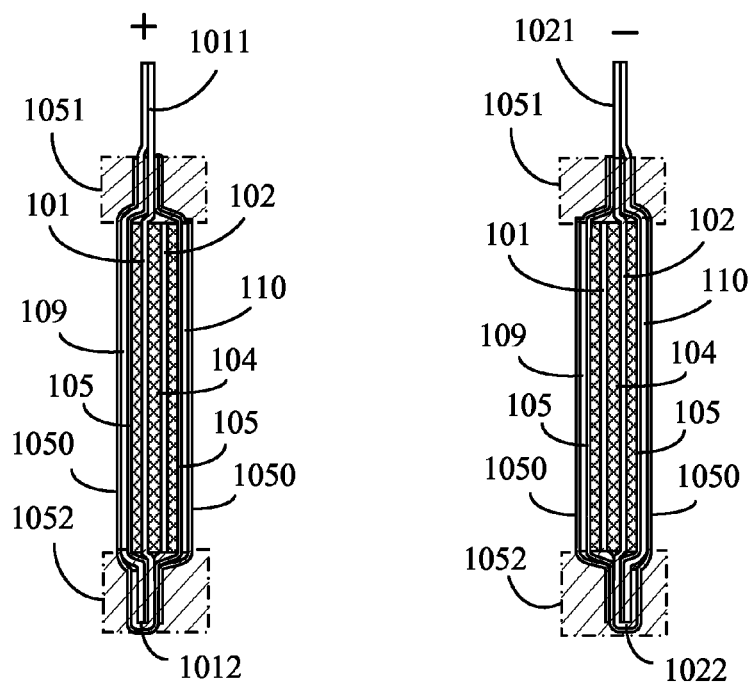
FIG. 30 is a lateral cross sectional view of FIG. 29 taken along A-A.
FIG. 31 is a lateral cross sectional view of FIG. 29 taken along B-B.

FIG. 30 is a lateral cross sectional view of FIG. 29 taken along A-A.

FIG. 31 is a lateral cross sectional view of FIG. 29 taken along B-B.

As shown in FIG. 29, FIG. 30 and FIG. 31, the single-sided input/output electric conductive terminal and the lateral positive electric conductive member (109) and the lateral negative electric conductive member (110) of the electrode plate pair of the electricity storing/discharging device with single-layer folding covering and packaging single input/output electric conductive interface having electrode plate pair with multiple-sided electric conductive terminals is sealed in a single-layer insulation status for forming as the rolling structure, and the input/output electric conductive terminal at one side is served as the single input/output electric conductive interface.

Figure 32:
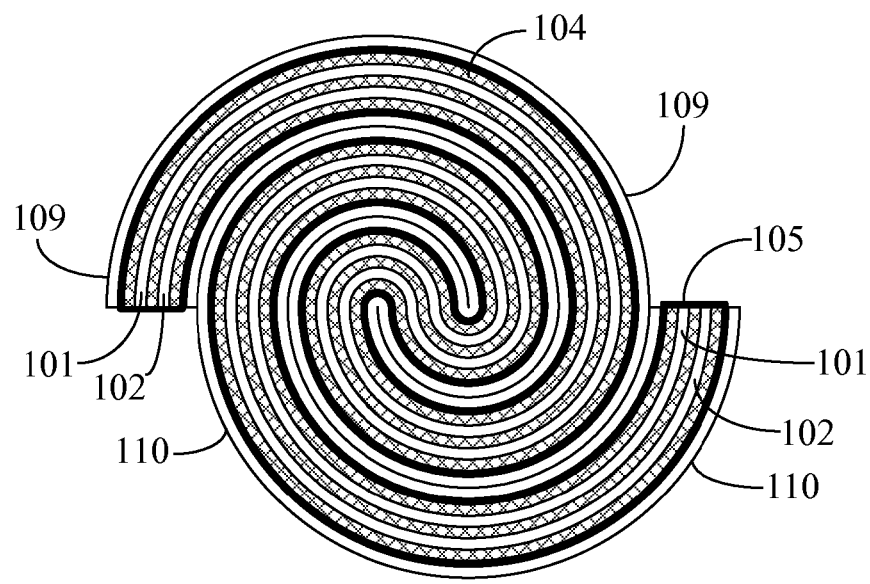
FIG. 32 is a cross sectional view showing the rolling structure shown in FIG. 29 taken along C-C according to the present invention.

FIG. 32 is a cross sectional view showing the rolling structure shown in FIG. 29 taken along C-C according to the present invention.

As shown in FIG. 32, for allowing the lateral positive electric conductive member (109), the lateral negative electric conducive member (110) and the input/output electric conductive terminal at one side to be sealed in a single-layer insulation status, the positive electrode plate (101), the negative electrode plate (102), the separator (104), the lateral positive electric conductive member (109) and the lateral negative electric conductive member (110) are formed as the rolling structure, and one or more of the single-sided individually-arranged input/output electric conductive terminals having positive polarity and one or more of the input/output electric conductive terminals having negative polarity are individually-arranged for structuring as the single input/output electric conductive interface.

Figure 33:
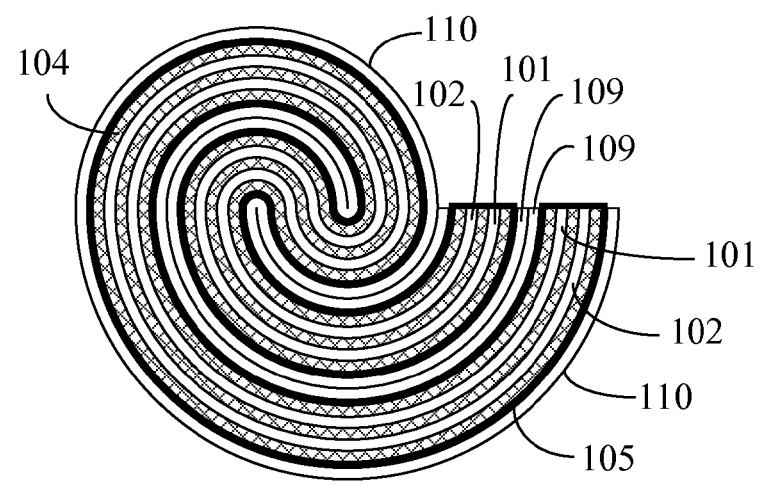
FIG. 33 is another cross sectional view showing the rolling structure shown in FIG. 29 taken along C-C according to the present invention.

FIG. 33 is another cross sectional view showing the rolling structure shown in FIG. 29 taken along C-C according to the present invention.

As shown in FIG. 33, for allowing the lateral positive electric conductive member (109), the lateral negative electric conducive member (110) and the input/output electric conductive terminal at one side to be sealed in a single-layer insulation status, the positive electrode plate (101), the negative electrode plate (102), the separator (104), the lateral positive electric conductive member (109) and the lateral negative electric conducive member (110) are formed as the rolling structure, and one or more of the single-sided adjacently-arranged positive input/output electric conductive terminals and one or more of the negative input/output electric conductive terminals are adjacently-arranged and homo-polarity connected in parallel for structuring as the single input/output electric conductive interface.

Figure 34:
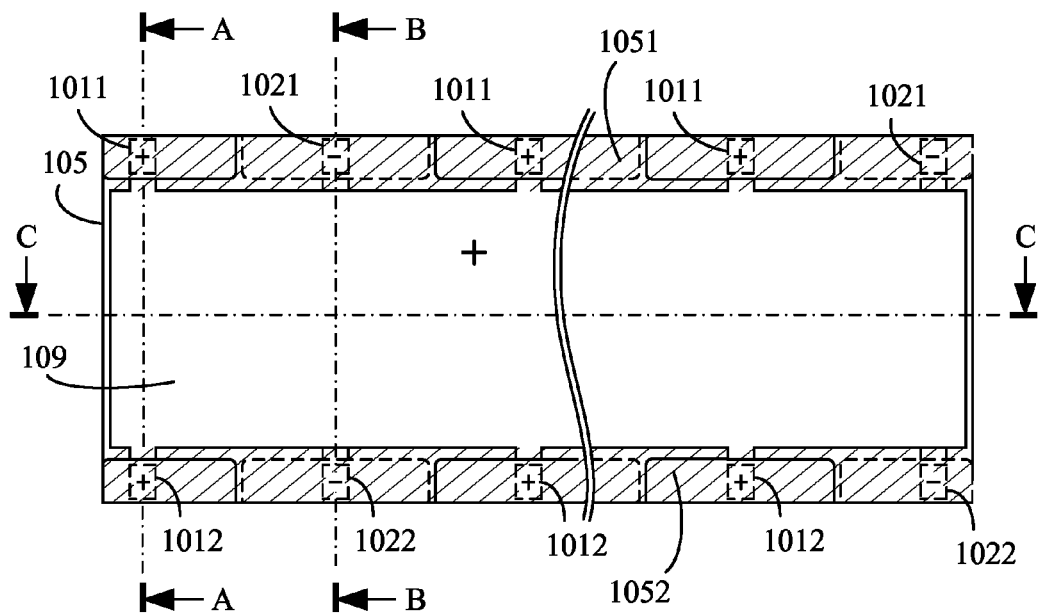
FIG. 34 is a structural unfold view of the electrode plate formed in the rolling structure showing the input/output electric conductive terminals at two sides of the electrode plate pair being sealed in a single-layer insulation status, and the lateral positive electric conductive member (109) and the lateral negative electric conductive member (110) being structured as the single input/output electric conductive interface according one embodiment of the present invention.

FIG. 34 is a structural unfold view of the electrode plate formed in the rolling structure showing the input/output electric conductive terminals at two sides of the electrode plate pair being sealed in a single-layer insulation status, and the lateral positive electric conductive member (109) and the lateral negative electric conductive member (110) being structured as the single input/output electric conductive interface according one embodiment of the present invention.

Figures 35, 36:
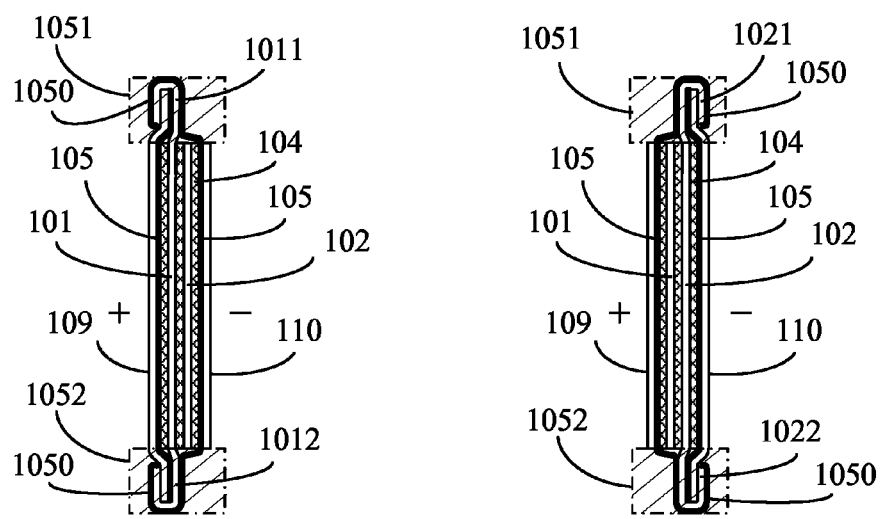
FIG. 35 is a lateral cross sectional view of FIG. 34 taken along A-A.
FIG. 36 is a lateral cross sectional view of FIG. 34 taken along B-B.

FIG. 35 is a lateral cross sectional view of FIG. 34 taken along A-A.

FIG. 36 is a lateral cross sectional view of FIG. 34 taken along B-B.

As shown in FIG. 34, FIG. 35 and FIG. 36, the input/output electric conductive terminals at two sides of the electrode plate pair of the electrode plate pair of the electricity storing/discharging device with single-layer folding covering and packaging single input/output electric conductive interface having electrode plate pair with multiple-sided electric conductive terminals are sealed in a single-layer insulation status, and the lateral positive electric conductive member (109) and the lateral negative electric conductive member (110) are structured as the single input/output electric conductive interface for forming the rolling structure.

Figure 37:
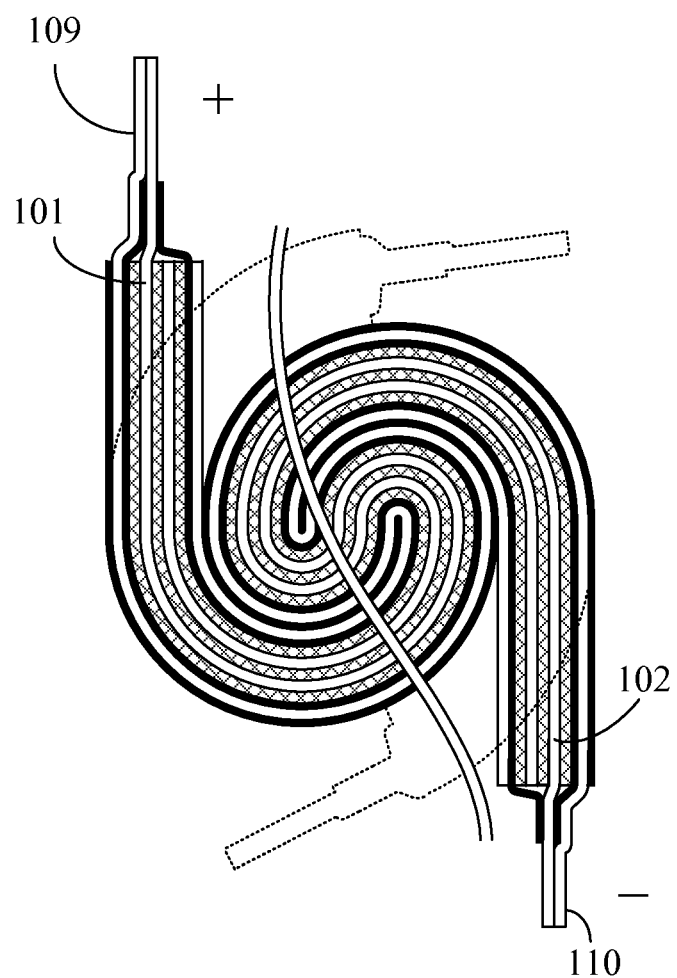
FIG. 37 is a cross sectional view showing the rolling structure shown in FIG. 34 taken along C-C according to the present invention.

FIG. 37 is a cross sectional view showing the rolling structure shown in FIG. 34 taken along C-C according to the present invention.

As shown in FIG. 37, for allowing the input/output electric conductive terminals at two sides of the electrode plate pair to be sealed in a single-layer insulation status, the lateral positive electric conductive member (109) and the lateral negative electric conducive member (110) at two sides are structured as the single input/output electric conductive interface.

The applications of the electricity storing/discharging device with single-layer folding covering and packaging single input/output electric conductive interface having electrode plate pair with multiple-sided electric conductive terminals are as followings:
- individually used; or
- homo-polarity connected in parallel; or
- homo-polarity connected in series; or
- reverse-polarity connected in series; or
- homo-polarity connected in series and in parallel, then two ends formed through the parallel connection being connected in series by polarity order for boosting voltage; or
- connected in series by polarity order for boosting voltage, homo-polarity connected in series then two ends having the same rated voltage formed through the serial connection being homo-polarity connected in parallel.

According to the electricity storing/discharging device with single-layer folding covering and packaging single input/output electric conductive interface having electrode plate pair with multiple-sided electric conductive terminals, the geometric shape of the electrode plate can be formed in various geometric shapes such as polygonal, circular or elliptical according to actual needs.

According to the electricity storing/discharging device with single-layer folding covering and packaging single input/output electric conductive interface having electrode plate pair with multiple-sided electric conductive terminals, two or more sides of each electrode plate are formed with the input/output electric conductive interface, and the two sides can be opposite sides or adjacent sides or three sides or more sides or the periphery of the circle or the ellipse.

According to the electricity storing/discharging device with single-layer folding covering and packaging single input/output electric conductive interface having electrode plate pair with multiple-sided electric conductive terminals, the input/output electric conductive terminal formed on the side of the electrode plate can be one or more than one.

The invention claimed is:
1. An electricity storing/discharging device, comprising:
   at least one positive electrode plate (101);
   at least one negative electrode plate (102);
   a separator (104) installed between the at least one positive electrode plate (101) and the at least one negative electrode plate (102);
   at least one first input/output terminal (1011) extending from a first side of the at least one positive electrode plate (101);
   at least one second input/output terminal (1021) extending from a first side of at least one negative electrode plate (102);
   at least one third input/output terminal (1012) extending from a second side opposite the first side of the at least one positive electrode plate (101);
   at least one fourth input/output terminal (1022) extending from a second side opposite the first side of the at least one negative electrode plate (102);
   a sealed packaging member (105) for enclosing the at least one positive electrode plate (101), the at least one negative electrode plate (102), and the separator (104) installed between the electrode plates (101,102) to form an electricity storage/discharge cell, wherein:
      the sealed packaging member (105) is formed with two folding covering and packaging segments (1050) for at least partially covering the at least one first input/output terminal (1011), the at least one second input/output terminal (1021), the at least one third input/output terminal (1012), and the at least one fourth input/output terminal (1022),
  wherein the sealed packaging member (105) includes a first sealing zone (1051) for sealing portions of the at least one first and second input/output terminals (1011,1021) that are adjacent the first side of the at least one positive electrode plate (101),
  wherein the sealed packaging member (105) further includes a second sealing zone (1052) for sealing portions of the at least one third and fourth input/output terminals (1012,1022) that are adjacent the second side of the at least one positive electrode plate (101), and at least one of the two folding covering and packaging segments (1050) is folded around respective ends of the at least one third and fourth input/output terminals (1012,1022) within the second sealing zone (1052), and
  wherein the sealed packaging member (105) is filled with an electrolyte,
a lateral positive electrically conductive member (109) extending along a first exterior side of the sealed packaging member (105) and electrically connecting the first input/output terminal (1011) to the third input/output terminal (1012);
a lateral negative electrically conductive member (110) extending along a second exterior side of the sealed packaging member (105) and electrically connecting the second input/output terminal (1021) to the fourth input/output terminal (1022),
  wherein the lateral positive electrically conductive member (109) and lateral negative electrically conductive member (110) form parallel electrical connections between the respective first and third input/output terminals (1011,1012) and second and fourth input/output terminals (1021,1022), and
  wherein the lateral positive electrically conductive member (109) and the lateral negative electrically conductive member (110), or the first and second input/output terminals (1011,1021), are not covered by the two folding covering and packaging segments (1050) and therefore exposed to form an input/output electrically conductive interface.

2. The electricity storing/discharging device of claim 1, wherein the two folding covering and packaging segments (1050) extend along sides of the electricity storing/discharging device to cover the lateral positive and negative electrically conductive members (109,110) while exposing end portions of the first and second input/output terminals (1011, 1021) that extend from the first sealing zone (1051) to form a single said input/output electrically conductive interface.

3. The electricity storing/discharging device as claimed in claim 2, wherein at least one of the lateral positive electrically conductive member (109) and the lateral negative electrically conductive member (110) each includes a substantially rectangular section.

4. The electricity storing/discharging device as claimed in claim 2, wherein at least one of the lateral positive electrically conductive member (109) and the lateral negative electrically conductive member (110) are substantially strip-shaped members.

5. The electricity storing/discharging device as claimed in claim 2, wherein at least one of the lateral positive electrically conductive member (109) and the lateral negative electrically conductive member (110) each includes a substantially circular section.

6. The electricity storing/discharging device of claim 1, wherein one of the two folding covering and packaging segments (1050) extends around ends of the first and second input/output terminals (1011,1021) and sealed within the first sealing zone (1051), and wherein the lateral positive and negative electrically conductive members (109,110) are exposed at sides of the electricity storing/discharging device to form said input/output electrically conductive interface.

7. The electricity storing/discharging device as claimed in claim 6, wherein at least one of the lateral positive electrically conductive member (109) and the lateral negative electrically conductive member (110) each includes a substantially rectangular section.

8. The electricity storing/discharging device as claimed in claim 6, wherein at least one of the lateral positive electrically conductive member (109) and the lateral negative electrically conductive member (110) are substantially strip-shaped members.

9. The electricity storing/discharging device as claimed in claim 6, wherein at least one of the lateral positive electrically conductive member (109) and the lateral negative electrically conductive member (110) each includes a substantially circular section.

10. The electricity storing/discharging device as claimed in claim 1, wherein the positive electrode plate (101) and the negative electrode plate (102) are each composed of at least one quadrilateral plate having a surface provided with an electrochemical material, and the separator (104) is a microporous or porous thin film made of a polypropylene (PP) or polyethylene (PE) to prevent self-discharge of the electricity storing/discharging device due to a short circuit between the positive and negative electrode plates (101,102).

11. The electricity storing/discharging device as claimed in claim 1, wherein the sealed packaging member (105) is made of an aluminum laminated film.

12. The electricity storing/discharging device as claimed in claim 1, wherein the electricity storing/discharging device is applied in at least one of the following configurations:
  as a stand-alone electricity storing/discharging device;
  as same-polarity electricity storing/discharging devices connected in parallel;
  as same-polarity electricity storing/discharging devices connected in series;
  as reverse-polarity electricity storing/discharging devices connected in series;
  as a pair of same-polarity electricity storing/discharging devices connected in parallel to each other and series-connected with another pair of same-polarity electricity storing/discharging devices connected in parallel; and
  as series connected electricity storing/discharging devices connected in parallel with another electricity storing/discharging device or series of electricity storing/discharging devices having a same polarity.

13. An electricity storing/discharging device, comprising:
  at least one positive electrode plate (101);
  at least one negative electrode plate (102);
  at least one first input/output terminal (1011) extending from a first side of the at least one positive electrode plate (101);
  at least one second input/output terminal (1021) extending from a first side of at least one negative electrode plate (102);

at least one third input/output terminal (1012) extending from a second side opposite the first side of the at least one positive electrode plate (101);

at least one fourth input/output terminal (1022) extending from a second side opposite the first side of the at least one negative electrode plate (102);

a separator (104) installed between the at least one positive electrode plate (101) and the at least one negative electrode plate (102);

a sealed packaging member (105) for enclosing the at least one positive electrode plate (101), the at least one negative electrode plate (102), and the separator (104) installed between the electrode plates (101,102) to form an electricity storage/discharge cell;

a lateral positive electrically conductive member (109) extending along a first exterior side of the sealed packaging member (105); and a lateral negative electrically conductive member (110) extending along a second exterior side of the sealed packaging member (105), wherein the at least one first and third input/output terminals (1011,1012) and one end of the lateral positive electrically conductive member (109) extends through respective first sealed openings in the sealed packaging member (105) and are joined together to form a positive input/output terminal on a first side of the rolled structure, wherein the at least one second and fourth input/output terminals (1021,1022) and one end of the lateral negative electrically conductive member (110) extend through respective second sealed openings in the sealed packaging member (105) and are joined together to form a negative input/output terminal on a second side of the rolled structure, and wherein the at least one positive electrode plate (101), the at least one negative electrode plate (102), the separator (104), the sealed packaging member (105), the lateral positive electrically conductive member (109), and the lateral negative electrically conductive member (110) extending along a second exterior side of the sealed packaging member (105) are formed into a rolled structure.

14. An electricity storing/discharging device as claimed in claim 13, wherein the rolled structure is arranged such that ends of the at least one positive electrode plate (101), the at least one negative electrode plate (102), and the separator (104) that are sealed within the sealed packaging member (105) are on opposite sides of the rolled structure such that the lateral positive electrically conductive member (109) is exposed on a first exterior portion of the rolled structure to serve as a positive input/output terminal, and the lateral negative electrically conductive member (110) is exposed on a second exterior portion of the rolled structure to serve as a negative input/output terminal.

15. An electricity storing/discharging device as claimed in claim 13, wherein the roller structure is arranged such that ends of the at least one positive electrode plate (101), the at least one negative electrode plate (102), and the separator (104) that are sealed within the sealed packaging member (105) are on a same side of the rolled structure such that the lateral negative electrically conductive member (110) is exposed on an entire curved exterior portion of the rolled structure to serve as a negative input/output terminal.

16. An electricity storing/discharging device as claimed in claim 13, wherein one end of the at least one positive electrode plate (101) and one end of the lateral positive electrically conductive member (109) extends through a first sealed opening in the sealed packaging member (105) and are joined together to form a positive input/output terminal on a first side of the rolled structure; and wherein one end of the at least one negative electrode plate (102) and one end of the lateral negative electrically conductive member (110) extends through a second sealed opening in the sealed packaging member (105) and are joined together to form a negative input/output terminal on a second side of the rolled structure.

* * * * *